United States Patent Office 3,663,719
Patented May 16, 1972

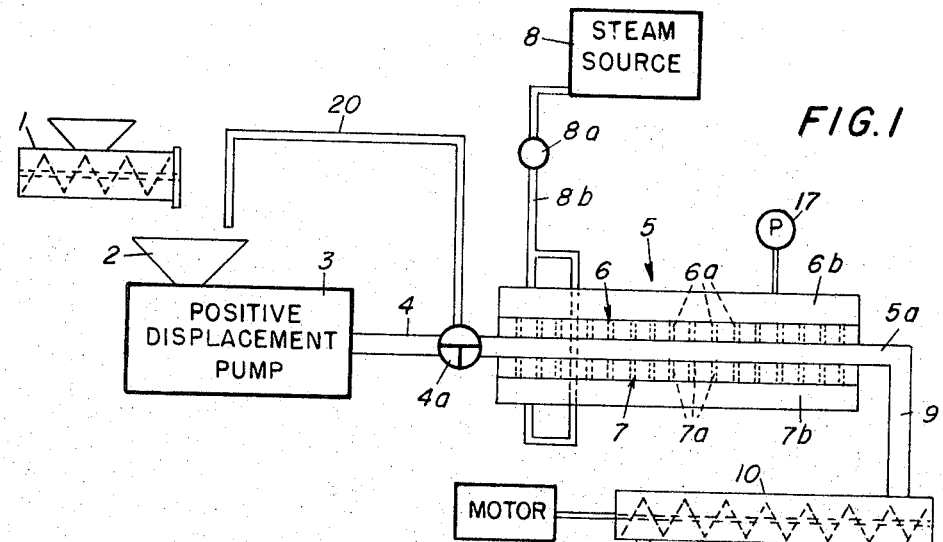
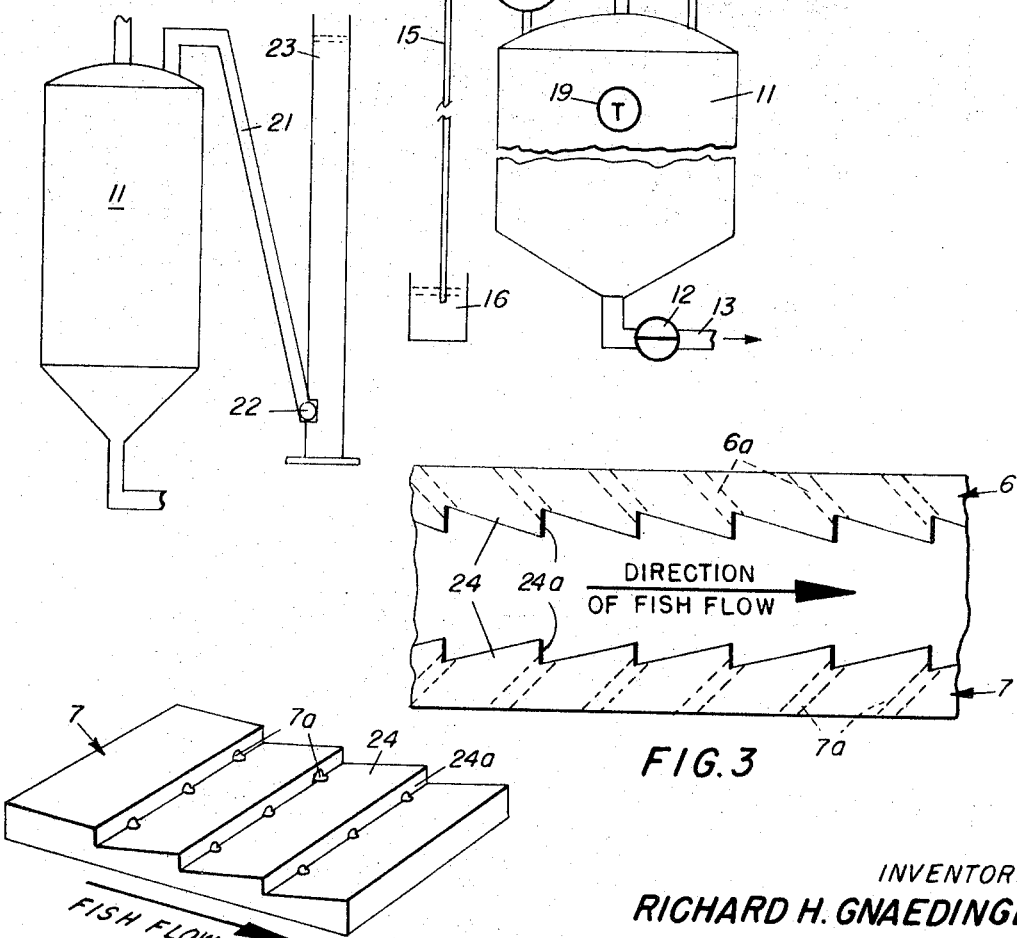

3,663,719
SYSTEM FOR COOKING FISH
Richard H. Gnaedinger, St. Louis, Mo., assignor to the United States of America as represented by the Secretary of the Interior
Filed Dec. 3, 1969, Ser. No. 881,785
Int. Cl. A22c 25/00; A23k 1/10
U.S. Cl. 99—7
6 Claims

ABSTRACT OF THE DISCLOSURE

Ground raw fish is passed through a cooker where it is confined as a thin layer while steam passes into it through both the top and bottom of the layer. A downstream screw conveyor supplies back pressure which prevents steam from blowing fish out of the cooker. Cooked fish, by-products and entrapped steam pass from the screw conveyor to a reservoir. A relief valve on the reservoir maintains a predetermined pressure throughout the system. In its preferred design the cooker includes two perforated parallel plates which confine the fish as a thin layer. The interior face of each plate, in cross-section, defines a serrated edge. Other ground meat besides fish can be cooked in the system.

This invention relates to treating fish which are low in human food-value.

Species of fish in certain parts of the world have changed gradually over the years. For example, in the Great Lakes region fish of high human food-value have almost disappeared and have been replaced by less desirable species, known as rough fish, not suitable for human food. Although the animal food market represents a very large outlet for these less desirable fish, many factors have prevented economic success in this area.

One example of the failure of full economic exploitation of rough fish in the animal food market is present in the pet-food industry, which uses large amounts of those fish. This market frequently becomes glutted due to the seasonal nature of the fisheries. If the excess fish are frozen during glut periods and stored for subsequent use, they undergo a gradual lowering of quality which makes the fish undesirable to the industry. Storage of large quantities of fresh fish presents economic barriers itself.

Mink farms provide another potentially large outlet for these fish since raw fish are generally regarded as an excellent food supplement for animals. However, mink ranchers do not routinely accept such fish because (a) their composition often varies seasonally which necessitates constant changes in ration formulation; (b) regular supplies of fresh fish cannot be had owing to the seasonal nature of the fisheries; (c) frozen raw fish, stored to compensate for off-seasonal slack, undergoes an undesirable gradual lowering of quality; (d) and many of these fish contain the enzyme, thiaminase, which detroys thiamin (valuable health vitamin $B_1$). Such fish are avoided by mink ranchers, some of whom cook all their fish as a preventative measure against thiaminase contamination and against other harmful enzymes and bacteria contamination, before serving the fish to their minks. These cooking methods often are not adequate to insure destruction of all harmful enzymes, and often lower the quality of even fresh fish.

These rough fish also represent a good food source for zoo animals, but the problems, economic and otherwise, that are encountered with the feeding of minks are also encountered with zoo animals, thereby restricting the desirability of these fish in this market, also.

Another possible utilization for these fish is in the manufacture of fish meal for poultry and swine, but this type of operation requires an initial investment too large for the individual fisherman. Also, the profitable operation of such a plant requires a large and sustained supply of raw material, a requirement, as stated previously, that is difficult to attain from fish due to the nature of the fish harvesting methods. Further, most of the raw fish would have to be transported to the plant, which would obviously increase material costs to the processer.

In my U.S. Pat. No. 3,429,710 issued Feb. 25, 1969, I disclose a fish cooker made of two closely spaced, perforated parallel plates through which ground fish is extruded in a thin layer and cooked by steam passing through the perforations in both plates. The patent claims are drawn to a process of cooking fish in this manner. By employing such a cooker, the rough fish are converted to a form very desirable to the animal food market.

I have now made further novel developments in the overall system employing the cooker disclosed in U.S. Pat. No. 3,429,710. Basically the system comprises feeding the ground fish to the cooker, cooking the fish with steam in an amount and under pressure sufficient to provide for the passage of some steam together with cooked fish to a downstream cooked fish reservoir or collector. It is also desirable that the steam pressure be sufficient to blow the fish out the exit of the cooker in the absence of downstream back pressure which is provided for by a downstream flow regulating device, such as a variable-speed screw conveyor, located between the cooker and cooked fish reservoir. A pressure regulating device is provided on the reservoir to set the cooking system pressure, and cooked fish is intermittently or continuously discharged from the reservoir for further processing such as solids-liquid separation (e.g., pressing) and packing.

It is therefore an object of the present invention to provide a process and apparatus to rapidly and inexpensively cook fish.

Another object is to provide a process and apparatus to cook rough fish at dockside or aboard ship.

Other objects and advantages will be obvious from the following more detailed description of the invention and the drawings in which:

FIG. 1 is a schematic of the system of the present invention;

FIG. 2 is a fragmentary view of the system of FIG. 1 including an alternative embodiment;

FIG. 3 is a fragmentary view of the preferred design of the cooker shown in FIG. 1; and FIG. 4 is a perspective view of one of the components of FIG. 3.

Referring to FIG. 1, raw fish is first ground up in grinder 1 having a plate with, for example, ¼ inch holes, and then passes to hopper 2 where it is introduced into a positive-displacement pump 3 such as a piston-type pump or screw feeder. The pump passes the ground fish through conduit 4 and three-way valve 4a to the primary cooking vessel 5 which includes two closely spaced parallel plates 6 and 7 having perforations 6a and 7a, respectively.

As the mass of fish travels between the plates it is confined on two parallel sides of the mass so as to define a thin layer. Chambers 6b and 7b in the cooker which are adjacent perforated plates 6 and 7, respectively, are supplied with steam by steam source 8, pressure regulator 8a and conduit 8b. In this manner the steam passes through the plates and then into the fish through both parallel sides of the thin layer. Superheated steam in the order of 10 to 20 p.s.i.g. is suitable.

Preferably, the number of holes 6a and 7a in the plates 6 and 7 is adjusted so that the total cross-sectional area of the holes is equal to the cross-sectional area of the steam lines 8b. Further, in the preferred construction of the cooker 5, the distance between plates 6 and 7 is generally the same as or slightly larger than the median particle diameter of the ground fish. This allows each particle a greater chance to be enveloped by steam during cooking rather than being enveloped by other fish particles, and results in the confined, thin layer of fish being substantially composed of a single layer of fish particles as it passes through the primary cooking zone.

Cooked fish exits from the cooker through conduit 9 and enters variable-speed screw conveyor 10. The fish, which still has steam dispersed throughout, continues to cook in this conveyor unit. Most importantly, screw conveyor 10 functions as a flow regulator for the fish through primary cooker 5 in that the conveyor moves the fish therethrough at a rate sufficient to provide a back pressure of fish in conduit 9 at the exit opening 5a of cooker 5. In this manner the fish is prevented from being blown out the cooker by the steam pressure, and is retained in the primary cooker 5 a predetermined length of time. Further, screw conveyor 10 breaks up any coagulated material coming from cooker 5 and thereby facilitates further cooking in the conveyor.

From the conveyor 10 the fish passes into reservoir or collection chamber 11. Cooked fish exits from the reservoir through discharge valve 12 and is conveyed by conduit 13 to, for example, pressing equipment to remove liquid by-products resulting from the cooking.

The steam exits from the system through the relief valve 14 in reservoir 11 and, if desired, the steam is conducted by tube 15 to water trap 16 for condensation purposes thereby eliminating the odor of cooked fish in the surrounding environment.

To help maintain control of the entire operation, a pressure gage 17 is provided on primary cooker 5, and a pressure gage 18 and temperature gage 19 are provided on reservoir 11.

In operation ground fish is initially continuously recirculated between hopper 2 and pump 3 by means of 3-way valve 4a and recycle conduit 20. Steam is then introduced into the system from steam source 8 flushing out all air. Discharge valve 12 at the bottom of reservoir 11 is closed and relief valve 14 is adjusted to open at a predetermined pressure, e.g., 15 p.s.i.g. Steam flow is adjusted so that a considerable excess is escaping through relief valve 14.

Ground fish is then injected into the cooker via 3-way valve 4a. When the fish starts to cook and consumes excess steam, the pressure drops. If the pressure drops below the release pressure, more steam is introduced from the source 8 until the relief valve opens again. In this manner there is always a flow of steam from the source to, and exiting from, the relief valve. This flow pattern keeps the holes open in perforated plates 6 and 7 in the primary cooker 5, and contributes toward moving the fish through the cooker 5 and into the conveyor screw 10. It also assures that an atmosphere of superheated steam is maintained inside the apparatus.

The flow rate of fish through the apparatus is adjusted by means of regulating the speed of variable-speed screw conveyor 10 so that the cooked product collected in reservoir 11 is at a predetermined desired temperature (in most instances about 185° F.), and so that a maximum cooking rate is attained. The flow rate (and, in turn, the cooking rate) vary with the type and initial temperature of the raw material.

At this point the system now operates without need for further adjustment until the reservoir is full. When this occurs, 3-way valve 4a is closed, discharge valve 12 is opened, and the pressure inside the system forces the cooked product from the reservoir. Preferably, a gaseous space is maintained above the cooked fish in the reservoir at all times so that the reservoir is discharged when it is not completely full. In this manner the relief valve at the top can operate without obstruction.

A more continuous operation is attained by the use of a rotary pressure valve as discharge valve 12 on reservoir 11. Such a valve is shown in Canadian Pat. No. 727,564. By employing such a valve, cooked fish is metered out from the reservoir at a rate equal to its introduction by positive displacement pump 3 into the primary cooker 5, and at all times maintains a certain level of cooked material in the reservoir.

Referring to FIG. 2, an alternative to controlling the pressure in the system is shown therein. In this embodiment the escaping steam is conducted by conduit 21 and one-way valve 22 to a water column 23. The height of the column is adjusted to select the proper pressure. Such a system also serves as an odor scrubber.

In FIG. 3 is shown the preferred configuration of the parallel plates 6 and 7 of primary cooker 5. The configuration, in cross-section, of the interior face of each plate is that of a plurality of serrations or saw teeth 24. The downstream side or edge 24a of each tooth is normal to the direction of flow of the fish through the vessel. This design is shown in perspective, with regard to plate 7, in FIG. 4. Any tooth 24 on one plate is directly opposite a like tooth on the other plate.

As can also be seen in FIGS. 3 and 4, all steam orifices or perforations 6a and 7a are located at the inner apices of the plate faces where one tooth joins another. This helps the orifices to remain unplugged with fish during operation of the system. Further to alleviate such plugging, the orifices are preferably slightly angled (e.g., about 20°) from the normal or perpendicular to the direction of flow of fish through the plate-defined channel so as to feed steam into the fish transversely but in a generally downstream direction.

Typical apparatus dimensions of some of the components for a small operation are as follows:

Cooker 5—3 inch diameter cylinder; 3 feet long.
Plate 6 or 7—3 inches wide; 3 feet long; ¼ inch thick; serrated every 3 inches, each serration being ⅛ inch deep; three 1/16 inch diameter orifices across the width of the plate at each inner apex defined by adjacent teeth; the plates are ½ inch apart.
Screw conveyor 10—3 inch diameter; 5 feet long; a convolution every 3 inches.
Reservoir or collector—18 inch diameter at its widest point; 3 feet high; capable of holding up to 200 pounds of cooked fish.

The system of the present invention, which is simple in construction and design, is adaptable to small volume commercial operations. Further, it offers a useful system for experimental purposes in small laboratories.

In addition to fish, other ground raw meat can be cooked in the system. In particular, ground, defeathered whole chickens (spent hens) are readily cooked therein.

What is claimed is:

1. A process for producing animal food from ground, raw rough fish comprising
   (a) feeding said ground fish to a cooking zone;
   (b) confining a mass of said fish on two parallel closely spaced plates to define a thin layer of ground fish throughout the space as said fish passes through said cooking zone;
   (c) passing cooked fish from said cooking zone to a collection zone;
   (d) regulating the rate of flow of said cooked fish in said cooking zone between the plates by rotary delivery means which develop a back pressure in the cooking zone by retarding flow;
   (e) passing steam into said ground fish through both of said parallel plates of said confined thin layer in said cooking zone to thereby cook said fish; said steam being added in an amount and at a pressure sufficient to provide for the passage of steam together with cooked fish to said collection zone, said steam being added in an amount and at a pressure sufficient to blow said confined thin layer of fish out of said cooking zone in the absence of said back pressure provided by said regulation of the flow rate, the steam which passes with said cooked fish out of said cooking zone being at a pressure above a predetermined pressure in said collection zone;

(f) releasing steam from said collection zone at a rate to maintain said predetermined pressure in the collection zone; and (g) withdrawing cooked fish from said collection zone.

2. The process of claim 1 wherein said cooked fish from said cooking zone is further cooked between said cooking zone and collection zone by said steam passing with said cooked fish to said collection zone.

3. The process of claim 1 wherein said confined layer is substantially composed of a single layer of fish particles.

4. The process of claim 2 wherein said confined layer is substantially composed of a single layer of fish particles.

5. The process of claim 1 wherein said cooked fish withdrawn from said collection zone is conveyed to a pressing zone.

6. The process of claim 2 wherein said cooked fish withdrawn from said collection zone is conveyed to a pressing zone.

References Cited

UNITED STATES PATENTS

| | | | |
|---|---|---|---|
| 3,429,710 | 2/1969 | Gnaedinger | 99—7 |
| 1,421,283 | 6/1922 | Meakin | 99—7 |
| 3,256,800 | 6/1966 | Halldorsson | 99—18 |
| 3,547,652 | 12/1970 | Jeffreys | 99—7 |
| 3,493,391 | 2/1970 | Pottie | 99—111 |
| 3,574,632 | 4/1971 | Lanz | 99—2 R |

NORMAN YUDKOFF, Primary Examiner

C. P. RIBANDO, Assistant Examiner

U.S. Cl. X.R.

99—2 R, 18, 111, 216